United States Patent
Kobayashi et al.

(10) Patent No.: US 7,245,362 B2
(45) Date of Patent: Jul. 17, 2007

(54) LENS METER

(75) Inventors: Toshiya Kobayashi, Kariya (JP); Tadashi Kajino, Okazaki (JP)

(73) Assignee: Nidek Co., Ltd., Gamagori-shi (JP)

( * ) Notice: Subject to any disclaimer, the term of this patent is extended or adjusted under 35 U.S.C. 154(b) by 256 days.

(21) Appl. No.: 11/114,116

(22) Filed: Apr. 26, 2005

(65) Prior Publication Data

US 2005/0237514 A1   Oct. 27, 2005

(30) Foreign Application Priority Data

Apr. 27, 2004   (JP) ............................ 2004-132027

(51) Int. Cl.
*G01B 9/00* (2006.01)
(52) U.S. Cl. ..................... 356/124; 356/127
(58) Field of Classification Search ........ 356/124–127; 451/5, 8
See application file for complete search history.

(56) References Cited

U.S. PATENT DOCUMENTS

| | | | |
|---|---|---|---|
| 3,880,525 A | | 4/1975 | Johnson |
| 5,231,460 A | * | 7/1993 | Kohayakawa ............... 356/125 |
| 5,734,465 A | | 3/1998 | Kajino |
| 5,844,671 A | * | 12/1998 | Kajino et al. ............... 356/124 |
| 5,910,836 A | | 6/1999 | Ikezawa et al. |
| 5,973,772 A | * | 10/1999 | Fukuma et al. ............. 356/124 |
| 6,061,123 A | | 5/2000 | Ikezawa et al. |
| 6,236,453 B1 | * | 5/2001 | Ikezawa et al. ............. 356/124 |
| 6,599,171 B2 | * | 7/2003 | Mizuno ......................... 451/8 |
| 6,798,501 B1 | * | 9/2004 | Mizuno ....................... 356/124 |
| 6,972,837 B2 | * | 12/2005 | Kajino ......................... 356/124 |
| 2003/0043367 A1 | | 3/2003 | Kajino |
| 2005/0190360 A1 | * | 9/2005 | Kajino ......................... 356/124 |
| 2005/0237513 A1 | * | 10/2005 | Hayashi et al. ............. 356/124 |

FOREIGN PATENT DOCUMENTS

| | | |
|---|---|---|
| JP | 50-145249 | 11/1975 |
| JP | A 8-247896 | 9/1996 |
| JP | A 8-261876 | 10/1996 |
| JP | A 9-43103 | 2/1997 |
| JP | A 10-104118 | 4/1998 |
| JP | A 10-104120 | 4/1998 |
| JP | A 2002-022605 | 1/2002 |
| JP | A 2002-098616 | 4/2002 |
| JP | A 2003-75296 | 3/2003 |

* cited by examiner

*Primary Examiner*—Hoa Q. Pham
(74) *Attorney, Agent, or Firm*—Oliff & Berridge, PLC

(57) ABSTRACT

A lens meter excellent in operability during alignment capable of informing in which direction a subject lens should be moved. A lens meter has a measurement optical system having an optical axis, a light source projecting a light bundle onto the lens, and a photo-sensor photo-receiving the bundle, a part which obtains the optical characteristics from a photo-receiving result, a device which detects an alignment condition of a desired position or region with the axis, a part which displays an alignment screen, and a part which provides fixed display of a target mark indicating a measurement position or region and provides movable display of a lens mark representing the lens and a guide mark indicating an alignment target position or region, where a movement direction of the lens relative to the axis coincides with movement directions of the lens mark and the guide mark relative to the target mark.

6 Claims, 5 Drawing Sheets

LENS METER

BACKGROUND OF THE INVENTION

1. Field of the Invention

The present invention relates to a lens meter for measuring optical characteristics of a lens.

2. Description of Related Art

Conventionally, there is known a lens meter which projects a measurement light bundle onto a subject lens to be measured placed on a measurement optical axis, and photo-receives the measurement light bundle having passed through the subject lens by the use of a photo-sensor, and then obtains optical characteristics such as refractive power of the subject lens based on the photo-receiving results. In this kind of lens meter, a screen for alignment which is utilized to align a desired position or a desired region of the subject lens with the measurement optical axis is displayed on a display. For example, in the case of measuring a progressive power lens, a progressive power lens mark (a graphic image) representing the progressive power lens is fixedly displayed in the screen, and a target mark indicating a measurement position or a measurement region of the subject lens is concurrently displayed in the screen to be movable in response to movement of the subject lens relative to the measurement optical axis.

However, in the conventional lens meter, especially in the case of measuring the subject lens in frames or in other cases, confusion sometimes arises when grasping a correlation of a position and a movement direction of the subject lens relative to the measurement optical axis with a position and a movement direction of the target mark relative to the lens mark in the screen, and an inexperienced examiner sometimes takes trouble in alignment.

SUMMARY OF THE INVENTION

An object of the invention is to overcome the problems described above and to provide a lens meter excellent in operability during alignment which is capable of informing in which direction a subject lens to be measured should be moved.

To achieve the objects and in accordance with the purpose of the present invention, a lens meter for measuring optical characteristics of a subject lens to be measured has a measurement optical system having a measurement optical axis, a light source which projects a measurement light bundle onto the subject lens along the measurement optical axis, and a photo-sensor which photo-receives the measurement light bundle having passed through the subject lens, a calculation part which obtains the optical characteristics of the subject lens based on a photo-receiving result by the photo-sensor, a detecting device which detects an alignment condition of one of a desired position and a desired region of the subject lens with respect to the measurement optical axis, a display part which displays a screen for alignment, and a display control part which provides fixed display of a target mark indicating one of a measurement position and a measurement region of the subject lens at a predetermined position in the screen and provides movable display of a lens mark representing the subject lens and a guide mark indicating one of a target position and a target region in alignment of the subject lens in the screen based on a detection result by the detecting means, where a movement direction of the subject lens relative to the measurement optical axis coincides with movement directions of the lens mark and the guide mark relative to the target mark.

Additional objects and advantages of the invention are set forth in the description which follows, are obvious from the description, or may be learned by practicing the invention. The objects and advantages of the invention may be realized and attained by the lens meter in the claims.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
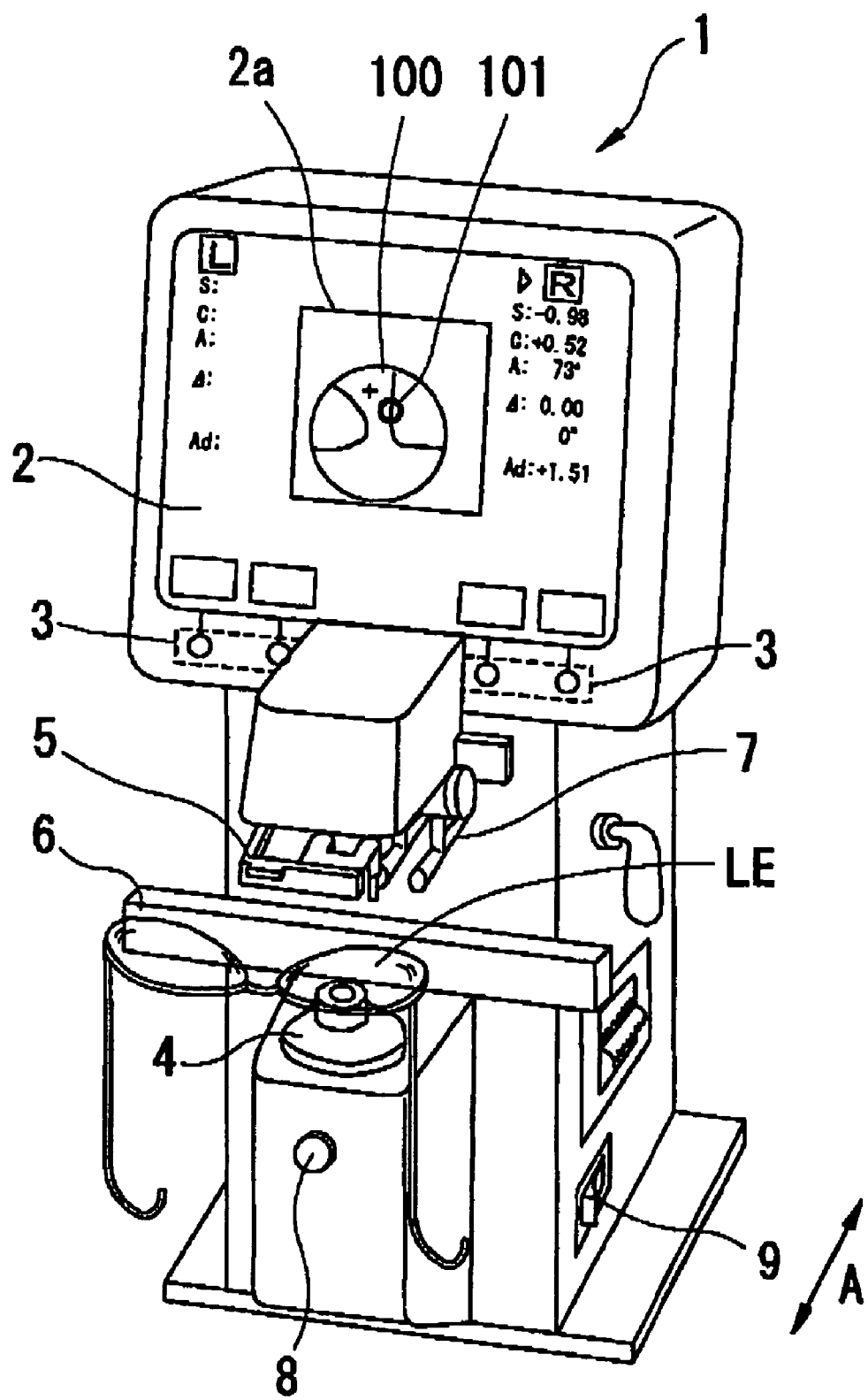
FIG. 1 is a schematic external view of a lens meter consistent with the preferred embodiment of the present invention.

A detailed description of one preferred embodiment of a lens meter embodied by the present invention is provided below with reference to the accompanying drawings. FIG. 1 is a schematic external view of a lens meter consistent with the preferred embodiment of the present invention.

On a display 2 such as a liquid crystal display arranged at the top of a body 1 of the lens meter, information necessary for measurement, measurement results, and the like are displayed. At the press of one of switches 3 corresponding to switch displays on the display 2, necessary instructions such as measurement mode switching are inputted.

A subject lens LE to be measured is mounted an a nosepiece (lens rest) 4, and a lens holder 5 is moved downward (to a nosepiece 4 side) to stably hold the lens LE mounted on the nosepiece 4.

When measuring the lens LE in frames, a frame table (lens table) 6 movable in a back/forth direction (the arrow A direction in FIG. 1) is brought into contact with the lower ends of right/left lens frames (i.e., the lower ends at the time of wearing spectacles) (or right/left lenses) for stabilization, so that a cylindrical axial angle of the lens LE can be accurately measured.

A marking mechanism 7 is used when providing a mark on the lens LE. A READ switch 8 is for transmitting an instruction signal for storing measurement results on the lens LE. At the press of the switch 8, the measurement results are displayed on the display 2 and concurrently stored into a memory inside the body 1. A power switch 9 is for applying power to the apparatus (lens meter).

Figure 2:
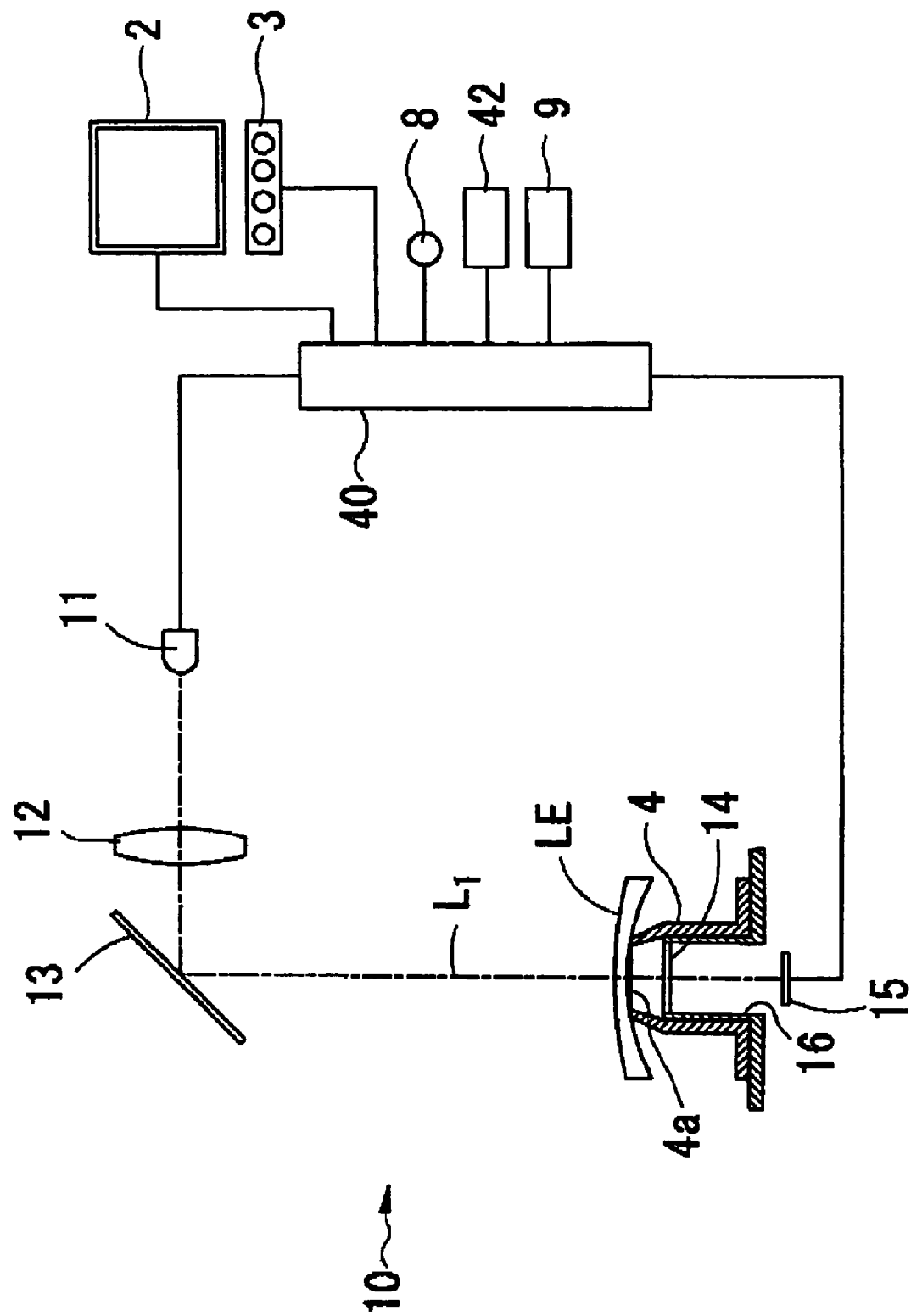
FIG. 2 is a view showing a schematic configuration of an optical system and a control system of the lens meter.

FIG. 2 is a view showing a schematic configuration of an optical system and a control system of the apparatus (lens meter) consistent with the present embodiment. Reference numeral 10 denotes a measurement optical system and L1 denotes a measurement optical axis thereof. The measurement optical system 10 is provided with a light source 11 for measurement such as an LED, a collimating lens 12, a reflection mirror 13, a target plate 14 on which measurement targets are formed, and a two-dimensional photo-sensor (image sensor) 15, which are arranged an the optical axis L1. The optical axis L1 passes through the center of an aperture 4a of the nosepiece 4 and is orthogonal to an aperture plane of the aperture 4a. The target plate 14 is held by a holding member 16 on the body 1 and is arranged immediately below the aperture 4a. The aperture 4a is in a circular shape of approximately 8 mm in diameter.

Figure 3:
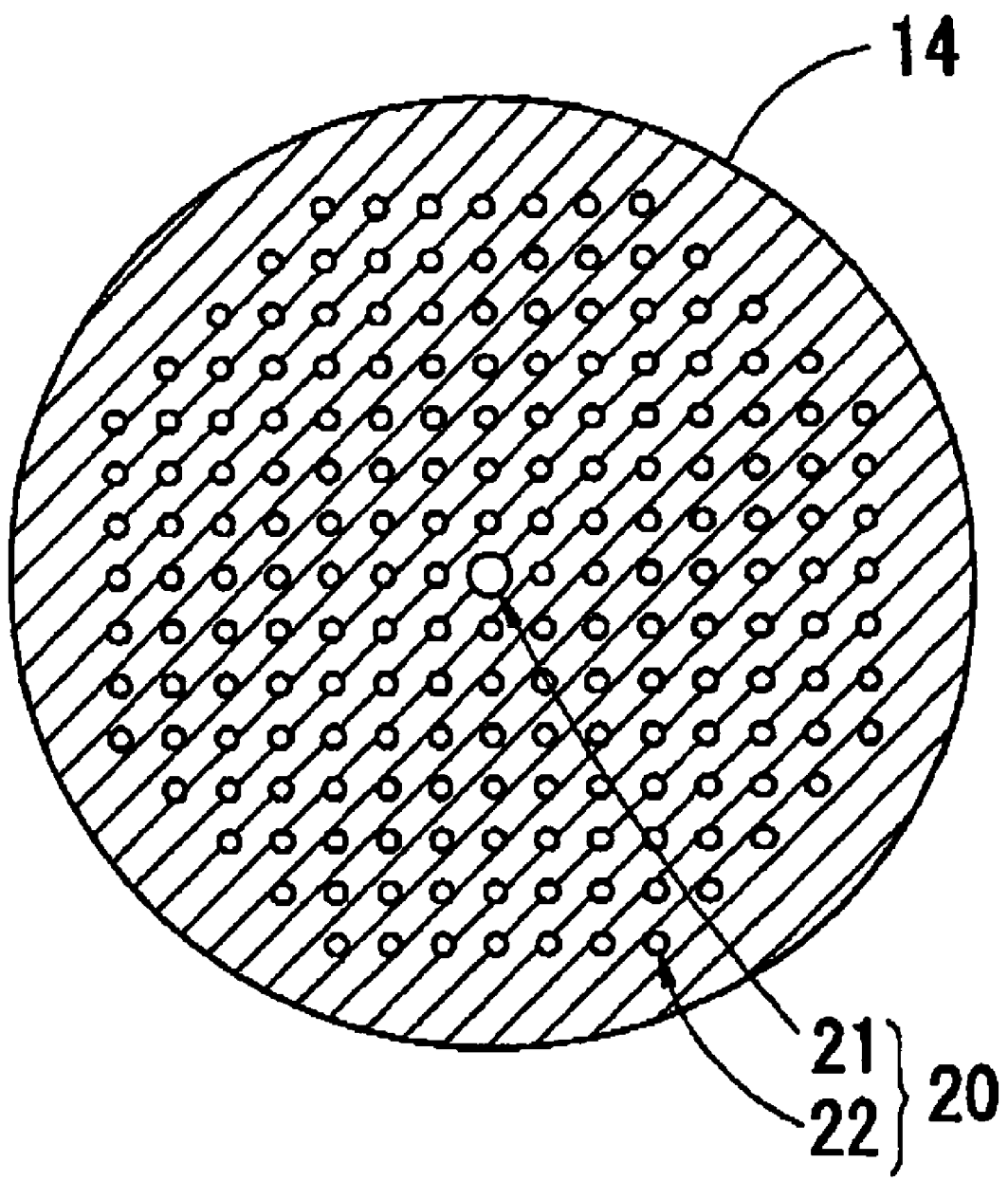
FIG. 3 is a view illustrating a pattern of arrangement (distribution) of measurement targets formed on a target plate.

FIG. 3 is a view illustrating a pattern of arrangement (distribution) of the measurement targets formed on the target plate 14. The target plate 14 is in a circular shape of slightly larger diameter than the internal diameter of the aperture 4a, and numbers of measurement targets 20 are formed thereon. The targets 20 consistent with the present embodiment are constituted of a large circular pinhole (aperture) of approximately 0.4 mm in diameter being a central target 21 which is arranged in a center position through which the optical axis L1 passes, and small circular pinholes (apertures) of approximately 0.2 mm in diameter being peripheral targets 22 with approximately 0.5 mm pitches on a grid which are arranged around the central target 21. The targets 20 which are about 200 in number are arranged in a range of approximately 7 mm in diameter having the optical axis L1 as the center. Besides, the targets 20 may be formed by applying black Cr coating, where voids are formed as the target 21 and the targets 22, to a rear surface of the target plate 14.

An image of the target 21 is utilized as an image of a reference target for specifying a correspondence among images of the targets 22, i.e., as an image of a reference target for specifying the images of the targets 22 in a measurement state where the lens LE is placed on the optical axis L1 with respect to the images of the targets 22 in a reference state where the lens LE is not placed on the optical axis L1 (i.e., a "OD (diopter) reference"). Besides, as long as the reference target is distinguishable from the other measurement targets, it may be arranged in a position other than the central position of the target plate 14, and the number and shape thereof are not limited.

A measurement light bundle from the light source 11 is made into a parallel light bundle by the collimating lens 12, reflected by the mirror 13, and projected onto the lens LE mounted on the nosepiece 4 and placed on the optical axis L1. In the measurement light bundle transmitted through the lens LE, a measurement light bundle passing through the aperture 4a and subsequently through the target (pinhole) 21 and the targets (pinholes) 22 on the target plate 14 enters the photo-sensor 15.

An output signal from the photo-sensor 15 is inputted to a calculation and control part 40. The calculation and control part 40 is connected with a memory 42. The calculation and control part 40 obtains optical characteristics (spherical power, cylindrical power, a cylindrical axial angle, prism power) of the lens LE from a change in positions (coordinates) of the respective target images detected by the photo-sensor 15 in the measurement state where the lens LE having refractive power is mounted on the nosepiece 4 and placed on the optical axis L1, with respect to positions (coordinates) of the respective target images detected by the photo-sensor 15 in the reference state where the lens LE is not mounted on the nosepiece 4 and not placed on the optical L1. For example, in a state where the lens LE having only the spherical power is placed on the optical axis L1, relative to the state where the lens LE is not placed thereon, the positions of the respective target images are changed to bring about magnification or demagnification in a perfect-circular shape with respect to an optical center of the lens LE. The spherical power is obtained based on a magnification amount or a demagnification amount at this time. Further, in a state where the lens LE having only the cylindrical power is placed on the optical axis L1, relative to the state where the lens LE is not placed thereon, the positions of the respective target images are changed to bring about magnification or demagnification in an oval shape with respect to an axial center of the lens LE. The cylindrical power and the cylindrical axial angle are obtained based on a magnification amount or a demagnification amount at this time. Further, the prism power is obtained based on a translation amount of the position of the image of the target 21 or the positions of the images of the targets 22 in the vicinity (periphery) thereof. The lens LE having the spherical power, the cylindrical power and the prism power may be regarded as the complex of the above lenses (see U.S. Pat. No. 3,880,525 corresponding to Japanese Patent Application Unexamined Publication No. Sho50-145249).

Incidentally, the calculation and control part 40 can obtain the optical characteristics (refractive powers) of the lens LE from an average of the change in the positions of the respective target images in each group while making four (at least three) adjacent target images (of 2×2 spots) one group, or adjacent target images of 3×3 spots, 4×4 spots, 5×5 spots, or the like one group. A measurement position (measurement point) at this time is set in a position of the lens LE corresponding to a central position or a position of a specific target image of each group of the target images. Therefore, owing to a constitution of the apparatus consistent with the present embodiment, the optical characteristics in a plurality of measurement positions (measurement points) within a measurement region of the lens LE corresponding to the aperture 4a may be obtained at a time. In other words, distribution of the optical characteristics within the measurement region may be obtained. Thus, in a progressive power lens, it is possible efficiently to judge whether or not at least one of the current measurement positions is in a distance portion (i.e., whether or not a part of the distance portion is within the current measurement region). similarly, it is possible efficiently to judge whether or not at least one of the current measurement positions is in a near portion (i.e., whether or not a part of the near portion is within the current measurement region), and whether or not at least one of the current measurement positions is in a progressive portion (i.e., whether or not a part of the progressive portion is within the current measurement region).

The calculation and control part 40 controls the display of the display 2 based on a detection result of an alignment condition of a desired position or a desired region of the lens LE with respect to the optical axis L1. Further, the calculation and control part 40 obtains the optical characteristic distribution within the measurement region successively at predetermined time intervals based on an output signal from the photo-sensor 15.

Besides, the measurement optical system is not limited to the constitution as shown in FIG. 2. For example, the target plate 14 may be arranged on a light source 11 side of the lens LE mounted on the nosepiece 4, and a plurality of light sources 11 may be arranged on a grid. When measuring the optical characteristic distribution, it is preferable that the measurement positions are in at least the up/down and right/left directions having the optical axis L1 as the center. It is essential only that the arrangement (distribution) of the targets 20 satisfies this condition. In a case where the nosepiece 4 is not used, the measurement region where measurement can be performed on the plurality of measurement positions at one time may be larger than the aperture 4a.

In the lens meter having the above-mentioned constitution, alignment operation of the progressive power lens will be mainly described. First, by means of the switches 3, a single vision lens measurement mode or a progressive power lens measurement mode is selected and a lens for right eye or a lens for left eye is designated as the lens LE. Hereinafter, description will be made on a case where the progressive power lens measurement mode is selected and the lens for right eye is designated.

Besides, the optical characteristics are obtained from the change in the positions of the respective target images in the group of the target images of 3×3 spots, and the measurement position is set in the position of the lens LE corresponding to the center position of the target images.

When the progressive power lens measurement mode is selected, a progressive power lens mark 100 representing the progressive power lens is displayed on a screen 2a for alignment in the display 2, and a circle target mark 101 indicating the measurement region (the measurement positions) is displayed in the mark 100. Since the near portion of the progressive power lens is located on an inner side (a nose side) by about 2 mm relative to the distance portion, when the lens for the right eye is designated, a range extending over the progressive portion and the near portion of the mark 100 is displayed while slightly tilted to the left (see FIGS. 1, 4A to 4E, and 5A to 5D). The mark 100 is displayed to be movable in response to a change in the alignment condition due to the movement of the lens LE on the nosepiece 4, while the mark 101 is fixedly displayed at the center of the screen 2a.

In addition, the mark 100 is displayed such that an upper side and a lower side in a state of wearing spectacles are inverted. Such display acts to guide the examiner to place the lens LE so that a lower side thereof is oriented to a back side of the apparatus and an upper side thereof is oriented to a front side of the apparatus when mounting the lens LE on the nosepiece 4. That is to say, an upper side of the screen 2a corresponds to the back side of the apparatus, and a lower side of the screen 2a corresponds to the front side of the apparatus.

Figure 4A:
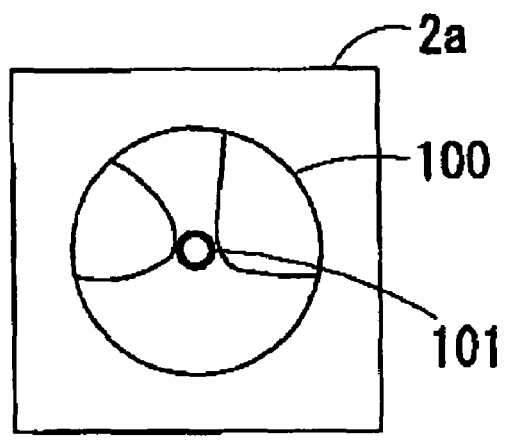
FIGS. 4A to 4B show display examples of a screen in a progressive power lens measurement mode.

Here, in a state where the lens LE is not mounted on the nosepiece 4, the mark 100 is displayed such that an approximate center part thereof is located at the mark 101 as shown in FIG. 4A. Such display acts to guide the examiner to place the lens LE so that an approximate center part of the lens LE is to be located (mounted) on the nosepiece 4. The approximate center part of the progressive power lens is often an approximate center part of the progressive portion with addition power; therefore, when specifying the distance portion, the movement of the lens LE is guided to shift the measurement region from a part with addition power to a part with no addition power, so that the distance portion can be specified more accurately.

Further, when the optical characteristics of the approximate center part of the progressive portion are measured, the calculation and control part 40 judges whether the up/down direction of the lens LE mounted on the nosepiece 4 is proper based on a difference (change) in the addition power of the measurement positions in the up/down direction having the optical axis L1 as the center. That is to say, if spherical equivalent power of an upper measurement position of the lens LE is greater than that of a lower measurement position of the lens LE, it is judged that the lens LE is placed (mounted) in an inverted position. At the time when such judgment is made, a warning as such is displayed on the display 2.

When the lens LE is mounted on the nosepiece 4, the calculation and control part 40 judges at which portion of the lens LE the measurement region (the measurement positions) is located based on the optical characteristic distribution within the measurement region. That is to say, if there is a difference (change) in the spherical equivalent power or the spherical power of the measurement positions in the up/down direction of the lens LE, the measurement region is judged to be in the approximate center part of the lens LE (the approximate center part of the progressive portion). If there is no difference (change) in the addition power or the cylindrical power of the measurement positions in the up/down and right/left directions of the lens LE and lateral prism power is approximately 0, the measurement region is judged to be in the approximate distance portion. If there is a difference (change) in the cylindrical power of the measurement positions in the right/left direction of the lens LE, the measurement region is judged to be in the an approximate right/left side of the progressive portion.

Figure 4B:
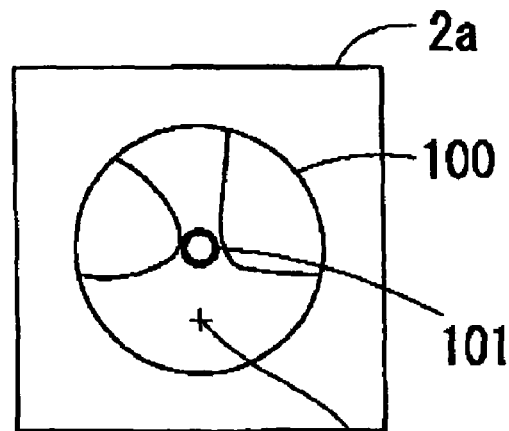
Figure 4C:
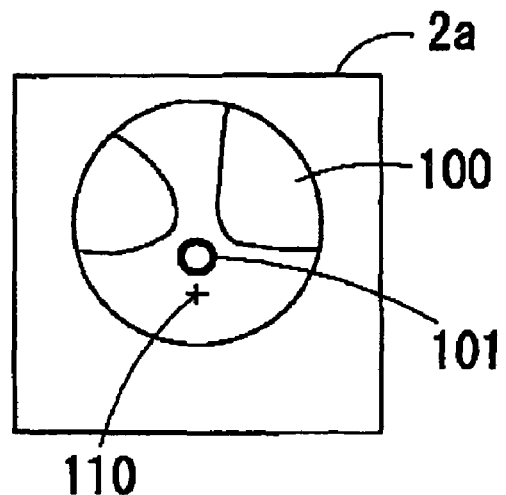

FIG. 4B shows a display example of the screen 2a when the lens LE is mounted on the nosepiece 4 and the measurement region is judged to be at the approximate center part of the lens LE. Incidentally, when the lens LE is judged to be mounted on the nosepiece 4, as a step toward guiding the measurement region initially to the distance portion, a cross guide mark 110 as a movement target for alignment is displayed within an area corresponding to the distance portion in the mark 100 so as to correlate with the display of the progressive portion. At this time, the calculation and control part 40 controls the memory 42 to initially store distribution information on the spherical equivalent power or the spherical power and the prism power. In a state of the display shown in FIG. 4B, when the lens LE is moved toward the back side of the apparatus so as to bring the mark 110 close to the mark 101, as shown in FIG. 4C, the mark 100 and the mark 110 are moved (i.e., the display positions are changed) to the upper side of the screen 2a relative to the mark 101 fixedly displayed at the center of the screen 2a. As the lens LE is moved, the prism power and the refractive power change, and the calculation and control part 40 calculates a travel distance from the position in which the initial storage is performed in accordance with the Prentice's rule [Deviation Distance from an Optical Center (mm)= (Prism Power (D)/Refractive Power (D))×10]. Then, based on the calculated travel distance, the mark 100 and the mark 110 are integrally moved (i.e., the display positions are changed) as needed.

Figure 4D:
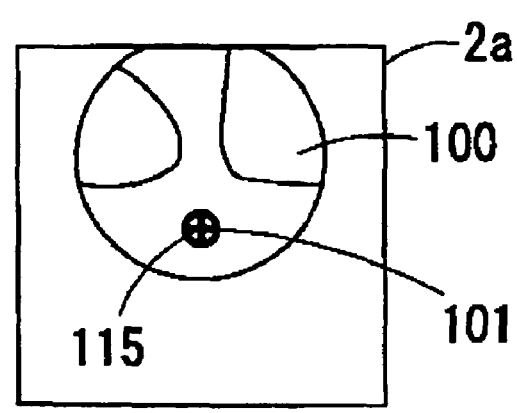

In order that the distance portion of the lens LE may be aligned with the optical axis L1, the examiner further moves the lens LE so that the mark 110 falls into the mark 101. Based on the change in the spherical equivalent power or the spherical power obtained at the optical axis, when the measurement region reaches a part with almost no addition power, the calculation and control part 40 judges the area as the distance portion, and controls to arrange the travel position of the mark 100 to bring a positional relationship that the mark 110 falls into the mark 101, and concurrently changes the mark 110 into a large cross mark 115 as shown in FIG. 4D. Thus, completion of the alignment with the distance portion is informed and measurement values of the distance portion are stored into the memory 42.

Figure 4E:
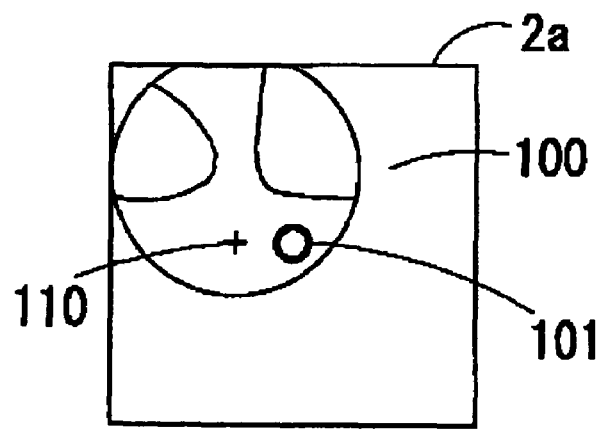

In the alignment with the distance portion, FIG. 4E shows a display example of a case where a deviation is generated in the alignment in the right/left direction. The deviation in the right/left direction is judged based on a difference (change) in the lateral prism power. In the example in FIG. 4E, it is essential only that the lens LE is moved in the right direction so that the mark 110 falls into the mark 101 on the right side of the screen 2a.

Incidentally, in the screen 2a in FIG. 4B, the mark 101 is displayed at the center of the mark 100. While the calculation and control part 40 can judge that the measurement is made on the progressive portion based on the difference (change) in the spherical equivalent power or the spherical power of the lens LE in the up/down direction, it cannot judge a distance to the distance portion. Therefore, in such a case that the actual measurement region is on the lower edge side of the lens LE in the progressive portion, when the mark 100 is moved at a predetermined ratio to the travel amount of the lens LE, the mark 100 and the mark 110 inadvertently pass the mark 101. With such a display, the examiner becomes confused as to in which direction the lens LE should be moved. Therefore, the present apparatus adopts a display method that travel amounts of the mark 100 and the mark 110 are decreased as the measurement region is brought close the distance portion and the mark 110 and the mark 101 coincide upon completion of the alignment.

To the contrary, in such a case that the actual measurement region is on the distance portion side of the progressive portion, the distance between the mark 110 and the mark 101 on the screen 2a sometimes appears to be longer than the actual distance. To cope with this problem, a display method is adopted in which, when the measurement region is judged to reach the distance portion, the mark 100 and the mark 110 are controlled to make a jump to complete the alignment. As the display responds at all times also during the movement of the lens LE, the examiner can easily grasp the measurement region and properly move the lens LE.

Figure 5A:
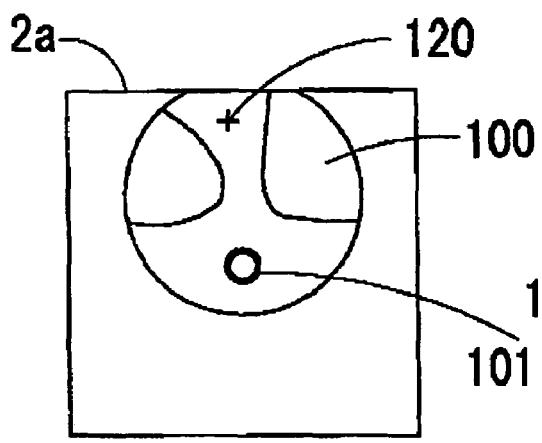
FIGS. 5A to 5D show second display examples of the screen in the progressive power lens measurement mode.

When the measurement values of the distance portion are stored into the memory 42, the measurement is shifted to a step of measuring the near portion. As shown in FIG. 5A, the mark 110 is deleted and another cross guide mark 120 is displayed within an area corresponding to the near portion in the mark 100 so as to correlate with the display of the progressive portion. The mark 120 may be in a shape different from the mark 110. Then, in order that the optical characteristics of the near portion can be measured, the lens LE is moved toward the front side of the apparatus so that the mark 120 falls into the mark 101. At this time, the calculation and control part 40 calculates a travel distance from the distance portion based on the prism power and the refractive power of the distance portion stored in the memory 42. Then, based on the calculated travel distance, the mark 120 and the mark 100 are displayed such that they are moved toward the mark 101 (i.e., the display positions are changed).

Figure 5B:
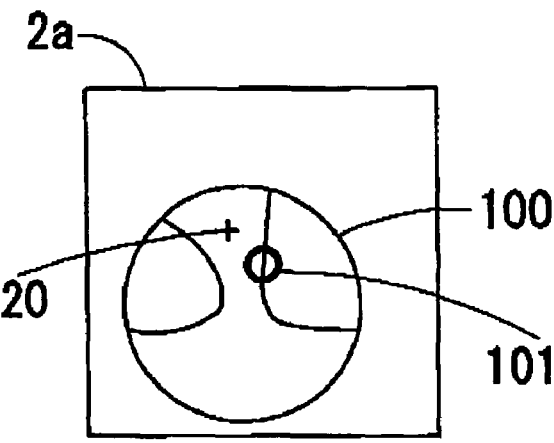
Figure 5C:
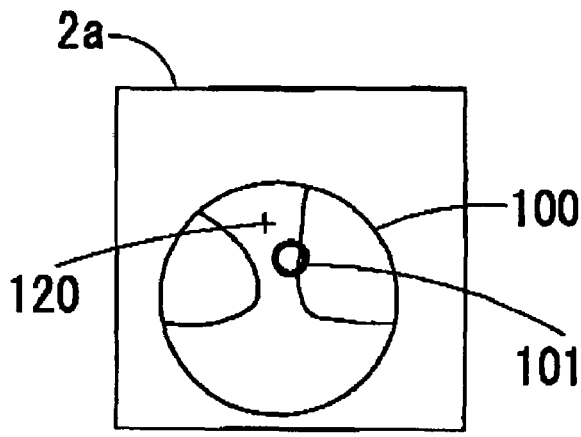

FIGS. 5B and 5C show examples in a case where the measurement region is deviated in the right direction from the progressive portion during the alignment with the near portion. The mark 101 and the progressive portion are displayed to give a conception that the measurement region is actually deviated from the progressive portion in the right direction. In this case, the mark 120 and the mark 100 are displayed while deviated to the left side relative to the mark 101, and thereby the examiner can immediately know that the lens LE should be moved in the right direction. The deviation in the right/left direction is determined by taking an absolute value of a difference between the cylindrical power of the distance portion previously stored and cylindrical power currently measured as an optical distortion, based on magnitude of the optical distortion detected at the measurement positions in the right/left direction having the optical axis L1 as the center. If a minimum value of the optical distortion is obtained in the measurement region on the left side of the optical axis, the optical axis L1 is judged to be deviated rightward. If the optical distortion at the optical axis is 0.5 D or more, the calculation and control part 40 displays the progressive portion in the mark 100 so as to overlap with the mark 101 as shown in FIG. 5B. Further, even if a deviation of which optical distortion is less than 0.5 D is generated, the deviation in the right/left direction of the progressive portion relative to the mark 101 may be displayed to present a deviation amount thereof (see FIG. 5C). At the time of the alignment with the near portion in the right/left direction, by displaying the deviation of the progressive portion in the mark 100 relative to the mark 101 as shown in FIGS. 5B and 5C, the examiner can be properly informed that the measurement region needs be returned to the progressive portion.

Figure 5D:
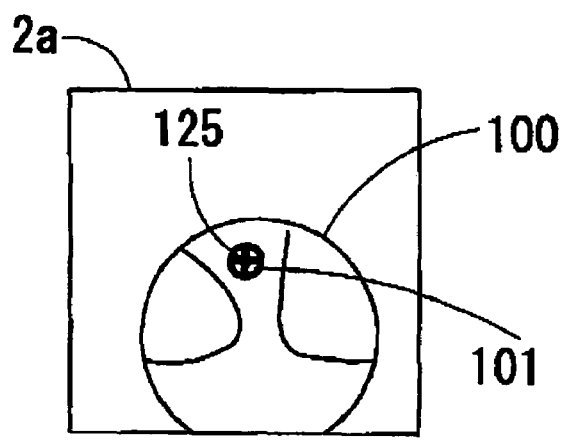

When the addition power (or the spherical equivalent power) detected at the measurement positions in the up/down direction having the optical axis L1 as the center is increased by the movement of the lens LE so as to bring the mark 120 close to the mark 101, and if it becomes almost constant at a certain point, the calculation and control part 40 judges that the measurement region in the up/down direction is in the near portion. Further, as for the right/left direction, if the minimum value of the optical distortion is obtained at the measurement position on the optical axis, it is judged that the measurement region in the right/left-direction is also in the near portion. When the measurement region is judged to be in the near portion, as shown in FIG. 5D, the mark 120 is changed into a large cross mark 125, which is displayed within the mark 101. Thus, the examiner may know completion of the alignment with the near portion, and at the press of the switch 8 by the examiner, measurement values of the near portion are stored into the memory 42 (the measurement values of the near portion may be automatically stored into the memory 42 upon completion of the alignment). As in the case of the alignment with the distance portion, the travel amounts of the mark 100 and the mark 120 are decreased and the mark 100 and the mark 120 are controlled to make a jump, also in the display of the alignment with the near portion.

Incidentally, in the progressive power lens in which no peak point is present in the addition power and the addition power continuously increases, judgment of the near portion cannot be performed; therefore, if the measurement region reaches the upper edge of the lens LE, it is essential only to press the switch 8 to complete the measurement. In this case, the mark 120 is displayed in a state it does not reach the mark 101.

As mentioned above, the display positions of the marks 100, 110 and 120 are controlled so that the mark 100 with the mark 110 or 120 are integrally moved to have a positional relationship such that the mark 100 including the progressive portion correlates with the mark 101 indicating the measurement region, and the distance portion or the near portion correlates with the progressive portion. Owing to the display control, the examiner may be correctly informed of the movement direction of the lens LE, so that he/she can perform the alignment operation easily and properly.

Figure 6:
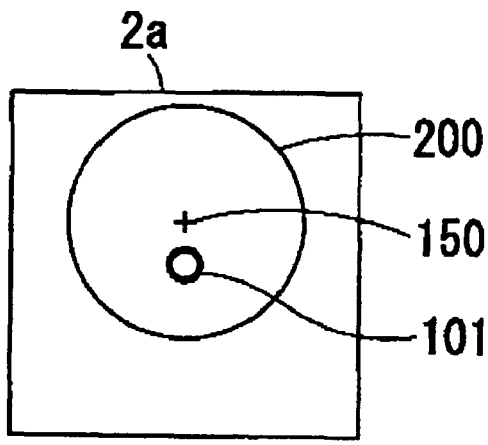
FIG. 6 shows a display example of the screen in a single vision lens measurement mode.

Besides, the display control of the screen 2a as described above can be applied not only to the progressive power lens measurement mode but also to the single vision lens measurement mode. That is to say, as shown in FIG. 6, with respect to the mark 101 fixedly displayed at the center of the screen 2a, a single vision lens mark 200 representing the single vision lens and a cross guide mark 150 corresponding to an optical center which is located at the center of the mark 200 are displayed and moved based on the alignment deviation.

Further, the measurement optical system is not limited to the aforementioned one capable of simultaneously measuring the optical characteristics of the measurement positions, and the above display control may be applied also to an optical system which performs one-point measurement of the optical characteristics of the subject lens by using a set of measurement light bundles having the measurement optical axis as the center (i.e., at least three measurement light bundles positioned along a single circumference).

Furthermore, while the switching between the progressive power lens measurement mode and the single vision lens measurement mode is made through switch operation in the above description, as there is a case where it is not known whether the lens LE is the single vision lens or the progressive power lens, it is convenient if a function of automatically judging whether the lens LE is the single vision lens or the progressive power lens is employed. In the optical system in FIG. 2, optical characteristics at a plurality of measurement positions within the measurement region may be simultaneously obtained; therefore, the differences (changes) in the spherical power, the spherical equivalent power, and the cylindrical power may be obtained without the movement of the lens LE. When a mode of automatically judging the progressive power lens is set through the switch 3, the apparatus is placed in the single vision lens measurement mode at the time of power application, and similarly to the case in FIG. 6, the mark 200 representing the single vision lens is displayed in the screen 2a.

When it is detected that the lens LE is mounted on the nosepiece 4, judgment on whether the lens LE is the progressive power lens or the single power lens is started. At this time, if the difference between the maximum value and the minimum value of the spherical equivalent power or the spherical power within the measurement region is 0.25 D or more, or if the difference between the maximum value and the minimum value of the cylindrical power is 0.25 D or more, the calculation and control part 40 judges that the lens LE is the progressive power lens. At this time, a message to the examiner that the lens LE is the progressive power lens is displayed, and the apparatus is automatically switched to the progressive power lens measurement mode (see FIGS. 4A to 4E). Then, the measurement of the progressive power lens is subsequently implemented in accordance with the screen 2a. On the other hand, when the lens LE is judged to be the single vision lens, the screen 2a remains as it is, and the apparatus is shifted to one-point measurement in which a single measurement value is obtained based on four target images corresponding to the center part of the measurement region. This is because, if the calculation and control part 40 performs calculation so as to obtain the optical characteristics at a plurality of the positions as provided above, calculation processing is slowly performed so that alignment operation takes time; however, in the case of the one-point measurement, the calculation processing is speedily performed to attain smooth alignment operation.

Moreover, the judgment on whether the lens LE is the progressive power lens or the single vision lens may be performed during the alignment operation. As the screen 2a is initially for the single vision lens measurement mode, the alignment is performed for moving the mark 150 to fall into the mark 101. During the alignment, the calculation and control part 40 judges whether the lens LE is the progressive power lens or the single vision lens. At this time, a measurement result is obtained from four target images corresponding to the center part of the measurement region as in the case of the one-point measurement and displayed on the display screen. Consequently, the measurement result may be obtained speedily when the lens LE is the single vision lens.

Further, even when the lens LE is the progressive power lens, accuracy of the judgment of the lens LE may be improved by performing alignment with the geometrical center of the lens LE. As the difference (change) in the power is relatively small in the approximate distance portion of the progressive power lens, when the approximate distance portion is mounted on the nosepiece 4, there is a possibility that the lens LE is erroneously judged to be the single vision lens. Therefore, if the display is made to perform alignment with the geometrical center of the lens LE, the difference (change) in the powers may be perceived during the movement of the lens LE, so that the lens LE may be judged to be the progressive power lens.

Incidentally, in the above description, switching to the progressive power lens measurement mode is automatically made when the lens LE is judged to be the progressive power lens; however, a constitution may be employed where a message asking whether the switching is to be made is displayed in the screen, and the examiner performs the switching through switch operation.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A lens meter for measuring optical characteristics of a subject lens to be measured, the lens meter comprising:
   a measurement optical system having
      a measurement optical axis,
      a light source which projects a measurement light bundle onto the subject lens along the measurement optical axis, and
      a photo-sensor which photo-receives the measurement light bundle having passed through the subject lens;
   a calculation part which obtains the optical characteristics of the subject lens based on a photo-receiving result by the photo-sensor;
   detecting means for detecting an alignment condition of one of a desired position and a desired region of the subject lens with respect to the measurement optical axis;
   a display part which displays a screen for alignment; and
   a display control part which provides fixed display of a target mark indicating one of a measurement position and a measurement region of the subject lens at a predetermined position in the screen and provides movable display of a lens mark representing the subject lens and a guide mark indicating one of a target position and a target region in alignment of the subject lens in the screen based on a detection result by the detecting means, where a movement direction of the subject lens relative to the measurement optical axis coincides with movement directions of the lens mark and the guide mark relative to the target mark.

2. The lens meter according to claim 1, further comprising made selecting means for selecting one of a single vision lens measurement mode and a progressive power lens measurement mode, wherein the display control part controls to display a progressive power lens mark in a case where the progressive power lens measurement mode is selected, controls to display the guide mark in an area corresponding to a distance portion in the progressive power lens mark when guiding one of the measurement position and the measurement region to fall within a distance portion of the subject lens, and controls to display the guide mark in an area corresponding to a near portion in the progressive power lens mark when guiding one of the measurement position and the measurement region to fall within a near portion of the subject lens.

3. The lens meter according to claim 2, further comprising judging means for judging a correlation between an orientation of the subject lens and an orientation of the progressive power lens mark at the time when the subject lens is placed on the measurement optical axis.

4. The lens meter according to claim 3, further comprising a lens rest which supports the subject lens, having an aperture of predetermined diameter through which the measurement optical axis passes, wherein the measurement optical system has a target plate having numbers of measurement targets, the calculation part obtains optical characteristic distribution within the measurement region based on a photo-receiving result by the photo-sensor on images of the targets formed by the measurement light bundle having passed through the lens, the aperture, and the target plate, where the measurement light bundle having passed through the measurement region is capable of passing through the aperture, and the judging means judges the correlation based on the obtained optical characteristic distribution within the measurement region.

5. The lens meter according to claim 1, further comprising a lens rest which supports the subject lens, having an aperture of predetermined diameter through which the measurement optical axis passes, wherein the measurement optical system has a target plate having numbers of measurement targets, the calculation part obtains optical characteristic distribution within the measurement region based on a photo-receiving result by the photo-sensor on images of the targets formed by the measurement light bundle having passed through the lens, the aperture, and the target plate, where the measurement light bundle having passed through the measurement region is capable of passing through the aperture, and the detecting means detects the alignment condition based on the obtained optical characteristic distribution within the measurement region.

6. The lens meter according to claim 1, wherein the display control part controls to display the target mark at the center of the screen.

* * * * *